Aug. 24, 1937.  E. H. TAYLOR  2,091,086
VEHICLE SIGNAL
Filed April 7, 1934
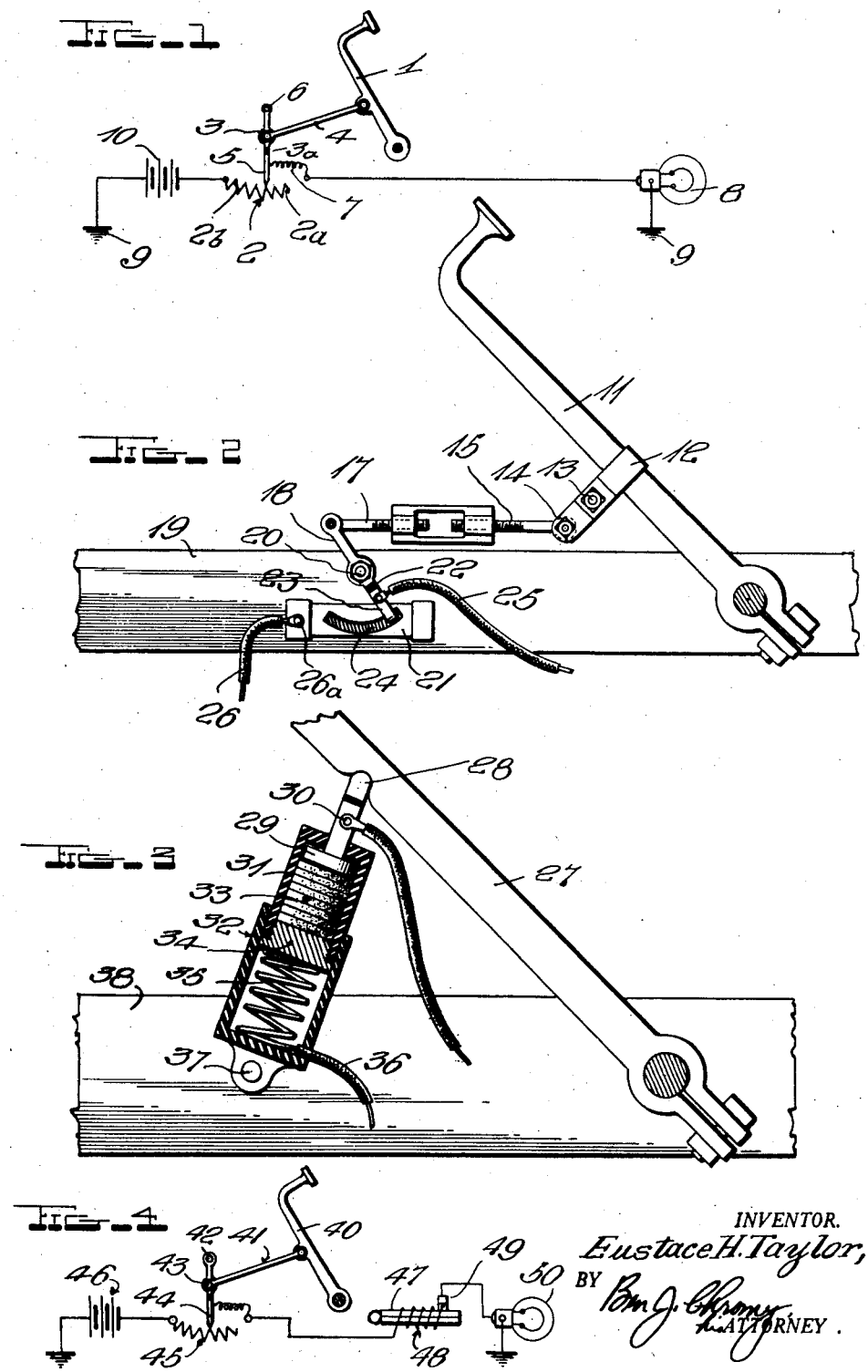
INVENTOR.
Eustace H. Taylor,
BY
ATTORNEY.

Patented Aug. 24, 1937

2,091,086

UNITED STATES PATENT OFFICE 2,091,086

VEHICLE SIGNAL

Eustace H. Taylor, Herndon, Va.

Application April 7, 1934, Serial No. 719,538

3 Claims. (Cl. 177—337)

This invention relates to vehicle signals generally. More specifically this invention relates to vehicle signals adapted to be operated by the brake controls of the vehicle to indicate the extent to which these controls have been applied.

An object of this invention is to provide a vehicle signal adapted to be controlled by one or more of the brake or similar controls of the motor vehicle whereby the extent to which the brakes or similar mechanisms have been applied is indicated.

Another object of this invention is to provide a vehicle signal adapted to be controlled by the foot brake of a motor vehicle to indicate the extent to which that brake has been applied.

Still another object of this invention is to provide a vehicle signal adapted to give varying illumination intensities, depending upon the extent to which the vehicle brake is applied.

A further object is to provide an illuminating vehicle signal in which the intensity of the illumination is proportioned to the extent of application of the vehicle brakes.

Other and further objects of this invention will be apparent to those skilled in the art to which it relates from the following specification and the appended claims.

In accordance with this invention, I provide a vehicle signal adapted to indicate the extent to which a vehicle control, particularly the foot operated brake, has been applied. My invention consists primarily of coupling an electrical circuit controlling device, such as a variable resistance, which is connected into the circuit of a rear vehicle lamp, or other rear indicating device, to the brake control lever or pedal, for the purpose of varying the intensity of illumination of the lamp or controlling the character or type of indication given at the rear of the vehicle, in accordance with the application or degree of application of the vehicle brakes or similar vehicle controls.

Various features of this invention will be apparent from the following specification and the drawing, in which, briefly, Fig. 1 illustrates an embodiment of this invention;

Fig. 2 illustrates a detail view of the circuit control resistance employed in accordance with this invention;

Fig. 3 illustrates a modified form of variable resistance control employed in an embodiment of this invention; and Fig. 4 shows a modified form of this invention.

Referring to the drawing in detail, reference numeral 1 designates the foot pedal arm of a motor vehicle employed for controlling the brakes of the vehicle. A resistance unit 2 made up of any conventional electric current conducting material having a relatively high resistance is provided with a movable contacting arm 3, pivotally attached to the connecting rod 4 which is linked to the pedal arm for movement in accordance therewith. The contacting arm 3 is provided with a metallic section 5 adapted to slidably engage the resistance 2 and supported upon the arm 3 by an insulating section 3a. A pivot 6 is provided to the arm 3 for supporting this arm and permitting movement thereof with respect to the resistance element. The contact 5 is connected by the wire 7 to the rear lamp 8 of a motor vehicle. This lamp is connected to the vehicle frame 9 or other electric current conducting medium which completes the circuit to the vehicle battery 10. The resistance element 2 is also connected to the battery 10 direct, as illustrated in Fig. 1.

In operation, when the brake pedal is depressed for application of the vehicle brakes, the arm 3 is moved by the rod 4 so that the contact 5 sweeps over the resistance element 2 and gradually increases the electric current flowing through the lamp 8 from the battery 10. Thus the brilliance of the lamp 8 illumination is controlled in accordance with the position of the foot operated brake pedal. Where it is desired, the resistance element 2 may be tapered in such a way that the value of the resistance per unit length adjacent to the end 2a will be larger or smaller than the value per unit length adjacent to the end 2b so that the current change, when the contact is moved over the resistance adjacent to the end 2a will be either larger or smaller than the current change when the contact is moved over the resistance adjacent to the end 2b. In this way the change in illumination brilliance of the light source 8 may be made to vary substantially in direct proportion to the movement of the resistance contact 5.

Fig. 2 illustrates a more practical embodiment of this invention in which a clamp 12, adjustable by releasing and tightening the bolt 13, is positioned upon the arm 11 of the foot pedal unit. A bolt 14 is provided to the clamp 12 to pivotally support the rod 15 thereon. A turnbuckle 16 cooperates with the threaded portions of the rods 15 and 17 and is employed to permit adjustment of the rheostat controlling arm 18, which is pivotally connected to the rod 17, without movement of the foot pedal arm 11.

Bolt 20 is employed to pivotally support the arm 18 on the vehicle frame 19. A metallic contacting element 23 cooperates with the resistance 24 which is enclosed in the casing 21 and supported on the frame 19 thereby. Proper insulating material is used inside of the casing 21 to insulate the resistance 24 from the latter. The contact 23 is also supported by a suitable insulator 22 on the arm 18 and is movable by the latter in accordance with the movement of arm 11. A connecting cable 25, such as is employed in connecting electric lights used on motor vehicles, is connected to the contact 23. A similar cable 26 is connected to the terminal 26a of the resistance.

The operation of the embodiment of this invention illustrated in Fig. 2 is similar to the operation of the embodiment illustrated in Fig. 1. The position of the arm 18 may be adjusted by adjusting the turnbuckle 16 or by adjusting the position of the clamp 12; in this way the contact 23 may be set to the most desirable position on the resistance 24 or out of contact with this resistance when the arm 11 is at its uppermost position.

In Fig. 3 an embodiment of this invention employing the compression type rheostat is employed. The arm 27 is provided with a socket for receiving the member 28 for applying pressure to the rheostat as the brake arm 27 is pressed downward. The member 28 is preferably of insulating material supported on the piston 29 which is of metal or other conducting material and engages the uppermost disc of the resistance carbon pile 33. A connecting cable 30 is connected to the piston 29 for making proper connections to the vehicle lamp circuit.

The carbon discs are enclosed in the casing 31 of insulating material, such as phenol condensation products, mica and the like. The threaded plug 34 of conducting material is positioned in the bottom of the casing 31. A spring 35 contacts the plug 34 and is connected to the cable 36 for the purpose of enabling easy and efficient connection of the carbon pile resistance into an electrical circuit. A rivet or bolt 37 is provided to support the casing 32 upon the frame member 38 and permit angular movement of the resistance unit as the plunger 29 and the casing 31 are moved in accordance with the movement of the arm 27.

The spring 35, in addition to functioning as an electrical contact for the lower end of the carbon pile, also functions to take up the additional movement of the casing 31.

The form of this invention illustrated in Fig. 4 employs a variable resistance 45, having a movable contact 44, operable by the pedal arm 40, linked thereto by the rod 41 which, pivoted to the contact arm at 43, is connected to the battery 46 and the thermostatic relay 47. The relay 47 is provided with a winding 48 of resistance material which is connected to one of the contacts 49. The other contact is connected to the lamp 50.

The operation of the embodiment of this invention illustrated in Fig. 4 is as follows: The current through the circuit of the lamp 50 is increased as the pedal arm 40 is depressed and the value of the resistance 45 in the circuit is decreased. After the current through the lamp circuit increases to a predetermined point corresponding to the maximum depression of the brake pedal the thermostatic relay 47 periodically opens and closes the circuit between the contacts 49, thus causing the lamp 50 to blink periodically. By adjusting the resistance of the winding 48 of the relay 47 this relay may be caused to open and close the lamp circuit at different current values, and in this way the lamp 50 may be made to blink shortly after the pedal arm 40 is depressed and the contact 44 caused to engage the resistance 45.

It is apparent to those skilled in the art to which this invention relates that other modifications of this invention may be made within the scope and spirit thereof; and, therefore, I do not desire to limit this invention to the particular details illustrated and described except in so far as they are defined by the appended claims.

What I claim and desire to secure by Letters Patent of the United States is as follows:

1. In signal controls adapted to be operated in accordance with the vehicle brake control pedal, a variable resistance unit, a light source adapted to be positioned at the rear of said vehicle, a thermal relay, a source of current supply, connections for connecting said resistance unit, said relay, said light source and said current supply in series, a lever connecting said vehicle control pedal to said variable resistance for controlling the effective value of said resistance in said series circuit for varying the brilliance of said light source from a dim light when said vehicle control pedal is slightly applied to a relatively bright light when said vehicle control pedal is more fully applied, said thermal relay being adjusted periodically to interrupt the circuit of said light source when said vehicle control pedal is substantially fully applied.

2. In signal controls adapted to be operated in accordance with the foot brake control pedal of a vehicle, a variable resistance unit, a light source adapted to be positioned at the rear of said vehicle, a source of current supply, connections for connecting said resistance unit, said light source and said current supply in series, a lever connected between said brake control and said variable resistance for controlling the effective value of said resistance in accordance with the position of said brake control for varying the brilliance of said light source in accordance with said brake control and a flashing device for interrupting the circuit of said light when said light is substantially of maximum brilliance.

3. In signal controls adapted to be operated in accordance with the vehicle brake control pedal, a variable resistance unit, a casing for said unit, said casing having an elongated opening formed therein for exposing surfaces of said resistance unit, a movable contact for frictionally engaging said exposed surface of said resistance unit, lever means for connecting said movable contact to said vehicle control for moving said contact in accordance with the movement of said control, a source of current supply connected to said unit, a light source connected in series with said unit and said current supply, and a flashing device connected in series with said light for continuously making and breaking the circuit of said light when said light is of substantially maximum brilliance.

EUSTACE H. TAYLOR.